C. N. & S. N. TRUMP.
DRILL-CHUCK.
No. 184,445. Patented Nov. 14, 1876.
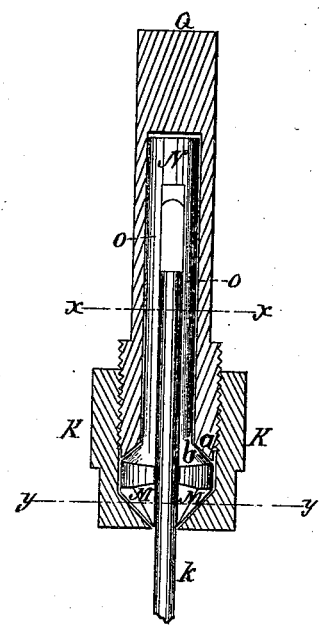
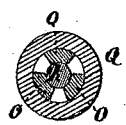
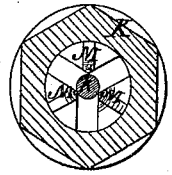
WITNESSES:
W. W. Hollingsworth
Golon C. Kernon
INVENTOR:
Charles N. Trump
Sam'l N. Trump
BY
ATTORNEYS.

UNITED STATES PATENT OFFICE.

CHARLES N. TRUMP AND SAMUEL N. TRUMP, OF WILMINGTON, DELAWARE.

IMPROVEMENT IN DRILL-CHUCKS.

Specification forming part of Letters Patent No. 184,445, dated November 14, 1876; application filed March 9, 1875.

*To all whom it may concern:*

Be it known that we, CHARLES N. TRUMP and SAMUEL N. TRUMP, of Wilmington, New Castle county, Delaware, have invented certain Improvements in Drill-Chucks, of which the following is a specification:

The object of our invention is to so construct a drill-chuck in which the drilling-tool is held between three or more spring-jaws that, while the tool will be self-adjusting in the chuck, it will be securely held by the latter without any uneven strain being brought to bear on the said jaws.

In the accompanying drawing, Figure 1 is a longitudinal section of the chuck, with a drilling-tool in position; Fig. 2, a section on the line $x\,x$; and Fig. 3, a section on the line $y\,y$.

The mandrel Q, made hollow for the reception of the tool-holding jaws, has a tapering mouth, $a$, for a purpose described hereafter, and is screw-threaded on the outside for the reception of an internally-threaded nut, K, the opening in which is made tapering at its lower end, as shown in Fig. 1, so that when in place the nut forms, with the mouth of the mandrel, a chamber tapering in opposite directions. N is a block of circular section, adapted to the circular opening in the mandrel Q, and having three spring-arms, $o$, on the end of each of which is formed a tool-holding jaw, M. These jaws are enlarged on their outer surfaces so as to form opposite conical faces corresponding to the chamber tapering in opposite directions, formed by the nut and the flaring mouth of the mandrel, so that when the block N with its jaws has been inserted in the mandrel, and the tool K placed between the jaws, and the nut K is screwed up, the opposite tapering surfaces will force the jaws in a lateral direction to gripe the tool, instead of bringing a strain on the jaws and forcing it in an inclined direction, as when only one cone-surface is used. It is necessary that there should be at least three jaws, M, in order that the tool may be held by the said jaws without necessitating its adjustment, as is required when only two jaws are used. Owing to the circular section of the opening in the mandrel and of the block N and its jaws, the latter can be detached and inserted in any position whatever. It will be seen that this device is simple, and cheaply made, being constructed of only three parts, and does not require any adjustment of either the tool or the tool-holder.

We are aware of the patent to Goodell, 141,345, July 29, 1873, in which are shown opposite conical surfaces for the purposes of closing the jaws of a bit-stock. This we do not desire to claim, broadly, but—

We claim as our invention—

The within-described drill-chuck, consisting of the mandrel Q, having a circular opening and circular flaring mouth, and the nut K with tapering opening, in combination with the block N and its spring-jaws M circular in section, and having opposite conical surfaces, all being constructed and arranged substantially as described.

CHAS. N. TRUMP.
SAML. N. TRUMP.

Witnesses:
S. McC. McPHERSON,
T. P. SULLIVAN.